United States Patent
Craig et al.

(10) Patent No.: US 8,996,636 B2
(45) Date of Patent: *Mar. 31, 2015

(54) METHODS, SYSTEMS, AND COMPUTER READABLE MEDIA FOR ANSWER-BASED ROUTING OF DIAMETER REQUEST MESSAGES

(71) Applicant: Tekelec, Inc., Morrisville, NC (US)

(72) Inventors: Jeffrey Alan Craig, Durham, NC (US); Mark Edward Kanode, Apex, NC (US); Thomas Matthew McCann, Raleigh, NC (US); David Michael Sprague, Raleigh, NC (US); Donald Eugene Wallace, Boulder, CO (US); Peter Joseph Marsico, Chapel Hill, NC (US)

(73) Assignee: Tekelec, Inc., Morrisville, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/016,000

(22) Filed: Aug. 30, 2013

(65) Prior Publication Data
US 2014/0074975 A1    Mar. 13, 2014

Related U.S. Application Data

(63) Continuation of application No. 13/026,112, filed on Feb. 11, 2011, now Pat. No. 8,527,598.

(60) Provisional application No. 61/304,310, filed on Feb. 12, 2010.

(51) Int. Cl.
*G06F 15/16*    (2006.01)
*H04L 12/759*    (2013.01)
(Continued)

(52) U.S. Cl.
CPC .......... *H04L 45/028* (2013.01); *H04L 63/0892* (2013.01);
(Continued)

(58) Field of Classification Search
USPC ......................................................... 709/238
See application file for complete search history.

(56) References Cited

U.S. PATENT DOCUMENTS 5,228,083 A    7/1993   Lozowick et al.
5,719,861 A    2/1998   Okanoue
(Continued)

FOREIGN PATENT DOCUMENTS

CA    2 716 544 A1    12/2010
CN    1809072 A       7/2006
(Continued)

OTHER PUBLICATIONS

Commonly-Assigned, Co-Pending Divisional U.S. Appl. No. 14/185,438 titled "Methods, Systems, and Computer Readable Media for Performing Diameter Answer Message-Based Network Management at a Diameter Signaling Router (DSR)." (unpublished. filed Feb. 20, 2014).

(Continued)

*Primary Examiner* — Dustin Nguyen
(74) *Attorney, Agent, or Firm* — Jenkins, Wilson, Taylor & Hunt, P.A.

(57) ABSTRACT

Methods, systems, and computer readable media for answer-based routing of Diameter request messages are disclosed. According to one method, a Diameter request message is received from a first Diameter node at a. A copy of at least a portion of the Diameter request message is cached at the DSR and the Diameter request message is routed to a second Diameter node. The DSR determines whether a predetermined condition associated with an answer to the first Diameter request message exists. In response to determining that the predetermined condition exists, the cached portion of the Diameter request message is retrieved, a Diameter request that includes the cached portion of the Diameter request message is generated, and the generated Diameter request message is routed.

22 Claims, 7 Drawing Sheets

(51) Int. Cl.
  *H04L 29/06* (2006.01)
  *H04L 12/721* (2013.01)
  *H04L 12/26* (2006.01)
  *H04L 12/773* (2013.01)
  *H04L 12/703* (2013.01)

(52) U.S. Cl.
  CPC ............... *H04L 69/08* (2013.01); *H04L 45/34* (2013.01); *H04L 43/0805* (2013.01); *H04L 45/60* (2013.01); *H04L 45/28* (2013.01)
  USPC .......................................... 709/206; 370/351

(56) References Cited

U.S. PATENT DOCUMENTS

| | | |
|---|---|---|
| 6,157,621 A | 12/2000 | Brown et al. |
| 6,273,622 B1 | 8/2001 | Ben-David |
| 6,304,273 B1 | 10/2001 | Bonnet |
| 6,584,073 B1 | 6/2003 | Steele, Jr. et al. |
| 6,725,401 B1 | 4/2004 | Lindhorst-Ko |
| 6,795,546 B2 | 9/2004 | Delaney et al. |
| 6,819,652 B1 | 11/2004 | Akhtar et al. |
| 6,865,153 B1 | 3/2005 | Hill et al. |
| 6,915,345 B1 | 7/2005 | Tummala et al. |
| 6,918,041 B1 | 7/2005 | Chen |
| 6,954,790 B2 | 10/2005 | Forslöw |
| 6,967,956 B1 | 11/2005 | Tinsley et al. |
| 7,042,877 B2 | 5/2006 | Foster et al. |
| 7,043,000 B2 | 5/2006 | Delaney et al. |
| 7,079,499 B1 | 7/2006 | Akhtar et al. |
| 7,107,041 B1 | 9/2006 | O'Driscoll |
| 7,136,635 B1 | 11/2006 | Bharatia et al. |
| 7,257,636 B2 | 8/2007 | Lee et al. |
| 7,286,516 B2 | 10/2007 | Delaney et al. |
| 7,292,592 B2 | 11/2007 | Rune |
| 7,298,725 B2 | 11/2007 | Rune |
| 7,333,438 B1 | 2/2008 | Rabie et al. |
| 7,333,482 B2 | 2/2008 | Johansson et al. |
| 7,383,298 B2 | 6/2008 | Palmer et al. |
| 7,403,492 B2 | 7/2008 | Zeng et al. |
| 7,403,537 B2 | 7/2008 | Allison et al. |
| 7,466,807 B2 | 12/2008 | McCann et al. |
| 7,551,926 B2 | 6/2009 | Rune |
| 7,567,796 B2 | 7/2009 | Tammi et al. |
| 7,583,963 B2 | 9/2009 | Tammi et al. |
| 7,590,732 B2 | 9/2009 | Rune |
| 7,633,872 B2 | 12/2009 | Pitcher et al. |
| 7,633,969 B2 | 12/2009 | Caugherty et al. |
| 7,706,343 B2 | 4/2010 | Delaney et al. |
| 7,792,981 B2 | 9/2010 | Taylor |
| 7,822,023 B2 | 10/2010 | Lahetkangas et al. |
| 7,894,353 B2 | 2/2011 | Li et al. |
| 7,898,957 B2 | 3/2011 | Lea et al. |
| 7,916,685 B2 | 3/2011 | Schaedler et al. |
| 7,961,685 B2 | 6/2011 | Suh et al. |
| 7,996,007 B2 | 8/2011 | Bantukul |
| 7,996,541 B2 | 8/2011 | Marathe et al. |
| 8,041,021 B2 | 10/2011 | Xu et al. |
| 8,045,983 B2 | 10/2011 | Bantukul |
| 8,170,035 B2 | 5/2012 | Furey et al. |
| 8,170,055 B2 | 5/2012 | Fang et al. |
| 8,219,697 B2 | 7/2012 | Langen et al. |
| 8,223,658 B2 | 7/2012 | Bahr |
| 8,359,015 B2 | 1/2013 | Swaminathan et al. |
| 8,468,267 B2 | 6/2013 | Yigang et al. |
| 8,478,828 B2 | 7/2013 | Craig et al. |
| 8,483,233 B2 | 7/2013 | Craig et al. |
| 8,498,202 B2 | 7/2013 | Kanode et al. |
| 8,504,630 B2 | 8/2013 | Craig et al. |
| 8,527,598 B2 | 9/2013 | Craig et al. |
| 8,532,110 B2 | 9/2013 | McCann et al. |
| 8,547,908 B2 | 10/2013 | Marsico |
| 8,554,928 B2 | 10/2013 | Craig et al. |
| 8,578,050 B2 | 11/2013 | Craig et al. |
| 8,601,073 B2 | 12/2013 | Craig et al. |
| 8,644,324 B2 | 2/2014 | Kanode et al. |
| 8,750,126 B2 | 6/2014 | McCann et al. |
| 2001/0024443 A1 | 9/2001 | Alriksson et al. |
| 2002/0049901 A1 | 4/2002 | Carvey |
| 2002/0051427 A1 | 5/2002 | Carvey |
| 2002/0087723 A1 | 7/2002 | Williams et al. |
| 2002/0133494 A1 | 9/2002 | Goedken |
| 2002/0133534 A1 | 9/2002 | Forslow |
| 2002/0141346 A1 | 10/2002 | Garcia-Luna-Aceves et al. |
| 2002/0181507 A1 | 12/2002 | Jones |
| 2003/0095536 A1 | 5/2003 | Hu et al. |
| 2003/0115358 A1 | 6/2003 | Yun |
| 2003/0225938 A1 | 12/2003 | Glasco et al. |
| 2004/0037278 A1 | 2/2004 | Wong et al. |
| 2004/0042485 A1 | 3/2004 | Gettala et al. |
| 2004/0098612 A1 | 5/2004 | Lee et al. |
| 2005/0002417 A1 | 1/2005 | Kelly et al. |
| 2005/0099964 A1 | 5/2005 | Delaney et al. |
| 2005/0232236 A1 | 10/2005 | Allison et al. |
| 2005/0232247 A1 | 10/2005 | Craig et al. |
| 2005/0235065 A1* | 10/2005 | Le et al. ........................ 709/238 |
| 2005/0246545 A1 | 11/2005 | Reiner |
| 2005/0246716 A1 | 11/2005 | Smith et al. |
| 2006/0045249 A1 | 3/2006 | Li et al. |
| 2006/0067338 A1 | 3/2006 | Hua et al. |
| 2006/0077926 A1 | 4/2006 | Rune |
| 2006/0101159 A1 | 5/2006 | Yeh et al. |
| 2006/0104210 A1 | 5/2006 | Nielsen |
| 2006/0123477 A1 | 6/2006 | Raghavan et al. |
| 2006/0172730 A1 | 8/2006 | Matsuda |
| 2006/0177007 A1 | 8/2006 | Vaghar et al. |
| 2006/0200670 A1 | 9/2006 | Kuffel et al. |
| 2006/0221972 A1 | 10/2006 | Bhargava et al. |
| 2006/0225128 A1 | 10/2006 | Aittola et al. |
| 2006/0253563 A1 | 11/2006 | Yang et al. |
| 2006/0274744 A1 | 12/2006 | Nagai et al. |
| 2007/0047539 A1 | 3/2007 | Agarwal et al. |
| 2007/0076600 A1 | 4/2007 | Ekl et al. |
| 2007/0153995 A1 | 7/2007 | Fang et al. |
| 2007/0168421 A1 | 7/2007 | Kalyanpur et al. |
| 2007/0214209 A1 | 9/2007 | Maeda |
| 2007/0280447 A1 | 12/2007 | Cai et al. |
| 2007/0297419 A1 | 12/2007 | Asherup et al. |
| 2008/0025230 A1 | 1/2008 | Patel et al. |
| 2008/0039104 A1 | 2/2008 | Gu et al. |
| 2008/0043614 A1 | 2/2008 | Soliman |
| 2008/0144602 A1 | 6/2008 | Casey |
| 2008/0167035 A1 | 7/2008 | Buckley et al. |
| 2008/0212576 A1 | 9/2008 | O'Neill |
| 2008/0301162 A1 | 12/2008 | Wall et al. |
| 2008/0317247 A1 | 12/2008 | Jeong et al. |
| 2009/0080440 A1 | 3/2009 | Balyan et al. |
| 2009/0083861 A1 | 3/2009 | Jones |
| 2009/0129271 A1 | 5/2009 | Ramankutty et al. |
| 2009/0138619 A1 | 5/2009 | Schnizlein et al. |
| 2009/0185494 A1 | 7/2009 | Li et al. |
| 2009/0193071 A1 | 7/2009 | Qiu et al. |
| 2009/0232011 A1 | 9/2009 | Li et al. |
| 2009/0264096 A1 | 10/2009 | Cai et al. |
| 2009/0319686 A1 | 12/2009 | Watanabe |
| 2010/0017846 A1 | 1/2010 | Huang et al. |
| 2010/0042525 A1 | 2/2010 | Cai et al. |
| 2010/0135287 A1 | 6/2010 | Hosain et al. |
| 2010/0251330 A1 | 9/2010 | Kroeselberg et al. |
| 2010/0265948 A1 | 10/2010 | Patel et al. |
| 2010/0299451 A1 | 11/2010 | Yigang et al. |
| 2010/0304710 A1 | 12/2010 | Sharma et al. |
| 2011/0060830 A1 | 3/2011 | Kang et al. |
| 2011/0116378 A1 | 5/2011 | Ramankutty et al. |
| 2011/0116382 A1 | 5/2011 | McCann et al. |
| 2011/0188397 A1 | 8/2011 | McCann et al. |
| 2011/0199895 A1 | 8/2011 | Kanode et al. |
| 2011/0199906 A1 | 8/2011 | Kanode et al. |
| 2011/0200047 A1 | 8/2011 | McCann et al. |
| 2011/0200053 A1 | 8/2011 | Kanode et al. |
| 2011/0200054 A1 | 8/2011 | Craig et al. |
| 2011/0202604 A1 | 8/2011 | Craig et al. |
| 2011/0202612 A1 | 8/2011 | Craig et al. |
| 2011/0202613 A1 | 8/2011 | Craig et al. |

(56) References Cited

U.S. PATENT DOCUMENTS

| | | |
|---|---|---|
| 2011/0202614 A1 | 8/2011 | Craig et al. |
| 2011/0202676 A1 | 8/2011 | Craig et al. |
| 2011/0202677 A1 | 8/2011 | Craig et al. |
| 2011/0202684 A1 | 8/2011 | Craig et al. |
| 2011/0225280 A1 | 9/2011 | Delsesto et al. |
| 2011/0225281 A1 | 9/2011 | Riley et al. |
| 2011/0225306 A1 | 9/2011 | Delsesto et al. |
| 2011/0302244 A1 | 12/2011 | McCann et al. |
| 2011/0314178 A1 | 12/2011 | Kanode et al. |
| 2012/0155389 A1 | 6/2012 | McNamee et al. |
| 2012/0224524 A1 | 9/2012 | Marsico |
| 2013/0039176 A1 | 2/2013 | Kanode et al. |
| 2013/0346549 A1 | 12/2013 | Craig et al. |

FOREIGN PATENT DOCUMENTS

| | | |
|---|---|---|
| CN | 101151861 A | 3/2008 |
| CN | 101252788 A | 8/2008 |
| EP | 1 134 939 A1 | 9/2001 |
| EP | 1 328 102 A1 | 7/2003 |
| EP | 1 465 385 A1 | 10/2004 |
| EP | 1 314 324 B1 | 8/2008 |
| EP | 1 847 076 B1 | 2/2012 |
| WO | WO 2008/087633 A2 | 7/2008 |
| WO | WO 2008/144927 A1 | 12/2008 |
| WO | WO 2009/058067 A1 | 5/2009 |
| WO | WO 2009/070179 A1 | 6/2009 |
| WO | WO 2009/128837 A1 | 10/2009 |
| WO | WO 2009/134265 A1 | 11/2009 |
| WO | WO 2011/047382 A2 | 4/2011 |
| WO | WO 2011/100587 A2 | 8/2011 |
| WO | WO 2011/100594 A2 | 8/2011 |
| WO | WO 2011/100600 A2 | 8/2011 |
| WO | WO 2011/100603 A2 | 8/2011 |
| WO | WO 2011/100606 A2 | 8/2011 |
| WO | WO 2011/100609 A2 | 8/2011 |
| WO | WO 2011/100610 A2 | 8/2011 |
| WO | WO 2011/100612 A2 | 8/2011 |
| WO | WO 2011/100615 A2 | 8/2011 |
| WO | WO 2011/100621 A2 | 8/2011 |
| WO | WO 2011/100626 A2 | 8/2011 |
| WO | WO 2011/100629 A2 | 8/2011 |
| WO | WO 2011/100630 A2 | 8/2011 |
| WO | WO 2012/119147 A1 | 9/2012 |

OTHER PUBLICATIONS

Final Office Action for U.S. Appl. No. 12/906,816 (Feb. 11, 2014).
Notice of Allowance and Fee(s) Due for U.S. Appl. No. 13/026,133 (Feb. 3, 2014).
Notice of Allowance and Fee(s) Due for U.S. Appl. No. 13/026,125 (Jan. 24, 2014).
Extended European Search Report for European Application No. 11742923.3 (Jan. 22, 2014).
Applicant-Initiated Interview Summary for U.S. Appl. No. 12/906,816 (Jan. 10, 2014).
Extended European Search Report for European Application No. 11742905.0 (Dec. 11, 2013).
Extended European Search Report for European Application No. 11742894.6 (Dec. 3, 2013).
Non-Final Office Action for U.S. Appl. No. 12/906,816 (Oct. 1, 2013).
Notice of Allowance and Fee(s) Due for U.S. Appl. No. 13/026,060 (Sep. 25, 2013).
Non-Final Office Action for U.S. Appl. No. 13/026,125 (Aug. 30, 2013).
Non-Final Office Action for U.S. Appl. No. 13/026,133 (Aug. 19, 2013).
Commonly-Assigned, Co-Pending Continuation U.S. Appl. No. 13/932,608 titled "Methods, Systems, and Computer Readable Media for Inter-Diameter-Message Processor Routing," (unpublished, filed Jul. 1, 2013).
Notice of Allowance and Fee(s) Due for for U.S. Appl. No. 13/026,076 (Jun. 27, 2013).
Restriction Requirement for U.S. Appl. No. 13/026,125 (Jun. 11, 2013).
Notice of Allowance and Fee(s) Due for U.S. Appl. No. 13/026,081 (Jun. 5, 2013).
Notice of Allowance and Fee(s) Due for U.S. Appl. No. 13/026,031 (May 30, 2013).
Notice of Allowance and Fee(s) Due for U.S. Appl. No. 13/412,352 (May 28, 2013).
Interview Summary for U.S. Appl. No. 13/026,098 (May 23, 2013).
Final Office Action for U.S. Appl. No. 13/026,060 (May 10, 2013).
Notice of Allowance and Fee(s) Due for U.S. Appl. No. 13/026,144 (May 1, 2013).
Notice of Allowance and Fee(s) Due for U.S. Appl. No. 13/026,112 (Apr. 26, 2013).
Notice of Allowance and Fee(s) Due for U.S. Appl. No. 13/026,153 (Apr. 15, 2013).
Notice of Allowance and Fee(s) Due for U.S. Appl. No. 13/026,162 (Apr. 1, 2013).
Supplemental Notice of Allowability for U.S. Appl. No. 13/026,031 (Mar. 22, 2013).
Notice of Allowance and Fee(s) Due for U.S. Appl. No. 13/026,098 (Mar. 11, 2013).
Interview Summary for U.S. Appl. No. 13/026,144 (Mar. 4, 2013).
Supplemental Notice of Allowability for U.S. Appl. No. 13/026,162 (Feb. 27, 2013).
Notice of Allowance and Fee(s) Due for U.S. Appl. No. 13/025,968 (Feb. 27, 2013).
Supplemental Notice of Allowability for U.S. Appl. No. 13/026,162 (Feb. 7, 2013).
Notice of Allowance and Fee(s) Due for U.S. Appl. No. 13/026,031 (Jan. 30, 2013).
Supplemental Notice of Allowability for U.S. Appl. No. 13/026,162 (Jan. 24, 2013).
Notice of Allowance and Fee(s) Due for U.S. Appl. No. 13/026,162 (Dec. 19, 2012).
Final Official Action for U.S. Appl. No. 13/026,076 (Dec. 7, 2012).
Final Official Action for U.S. Appl. No. 13/026,105 (Nov. 26, 2012).
Communication of European Publication Number and Information on the Application of Article 67(3) EPC for European Patent Application No. 11742923.3 (Nov. 21, 2012).
Communication of European Publication Number and Information on the Application of Article 67(3) EPC for European Patent Application No. 11742912.6 (Nov. 21, 2012).
Communication of European Publication Number and Information on the Application of Article 67(3) EPC for European Patent Application No. 11742909.2 (Nov. 21, 2012).
Communication of European Publication Number and Information on the Application of Article 67(3) EPC for European Patent Application No. 11742906.8 (Nov. 21, 2012).
Communication of European Publication Number and Information on the Application of Article 67(3) EPC for European Patent Application No. 11742905.0 (Nov. 21, 2012).
Communication of European Publication Number and Information on the Application of Article 67(3) EPC for European Patent Application No. 11742901.9 (Nov. 21, 2012).
Communication of European Publication Number and Information on the Application of Article 67(3) EPC for European Patent Application No. 11742894.6 (Nov. 21, 2012).
Non-Final Official Action for U.S. Appl. No. 13/026,153 (Nov. 6, 2012).
Non-Final Official Action for U.S. Appl. No. 13/412,352 (Oct. 26, 2012).
Non-Final Official Action for U.S. Appl. No. 13/026,144 (Oct. 16, 2012).
Non-Final Official Action for U.S. Appl. No. 13/026,098 (Sep. 20, 2012).
Non-Final Official Action for U.S. Appl. No. 13/026,060 (Sep. 19, 2012).
Communication of European Publication Number and Information on the Application of Article 67(3) EPC for European Patent Application No. 11742921.7 (Sep. 12, 2012).

(56) References Cited

OTHER PUBLICATIONS

Non-Final Official Action for U.S. Appl. No. 13/026,081 (Sep. 12, 2012).
Non-Final Official Action for U.S. Appl. No. 13/026,112 (Aug. 29, 2012).
Communication of European publication number and information on the application of Article 67(3) EPC for European Application No. 10824243.9 (Jul. 25, 2012).
Notification of Transmittal of the International Search Report and the Written Opinion of the International Searching Authority, or the Declaration for International Patent Application No. PCT/US2012/027736 (Jun. 12, 2012).
Advisory Action for U.S. Appl. No. 12/906,816 (Jun. 5, 2012).
Non-Final Official Action for U.S. Appl. No. 13/026,076 (Jun. 4, 2012).
Applicant-Initiated Interview Summary for U.S. Appl. No. 12/906,816 (May 17, 2012).
Non-Final Official Action for U.S. Appl. No. 13/026,105 (May 16, 2012).
Final Official Action for U.S. Appl. No. 12/906,816 (Feb. 21, 2012).
Applicant-Initiated Interview Summary for U.S. Appl. No. 12/906,816 (Jan. 27, 2012).
Notification of Transmittal of the International Search Report and the Written Opinion of the International Searching Authority, or the Declaration for International Application No. PCT/US2011/024622 (Oct. 31, 2011).
Notification of Transmittal of the International Search Report and the Written Opinion of the International Searching Authority, or the Declaration for International Application No. PCT/US2011/024617 (Oct. 31, 2011).
Notification of Transmittal of the International Search Report and the Written Opinion of the International Searching Authority, or the Declaration for International Application No. PCT/US2011/024614 (Oct. 31, 2011).
Notification of Transmittal of the International Search Report and the Written Opinion of the International Searching Authority, or the Declaration for International Application No. PCT/US2011/024646 (Oct. 28, 2011).
Notification of Transmittal of the International Search Report and the Written Opinion of the International Searching Authority, or the Declaration for International Application No. PCT/US2011/024645 (Oct. 28, 2011).
Notification of Transmittal of the International Search Report and the Written Opinion of the International Searching Authority, or the Declaration for International Application No. PCT/US2011/024642 (Oct. 28, 2011).
Notification of Transmittal of the International Search Report and the Written Opinion of the International Searching Authority, or the Declaration for International Application No. PCT/US2011/024621 (Oct. 28, 2011).
Notification of Transmittal of the International Search Report and the Written Opinion of the International Searching Authority, or the Declaration for International Application No. PCT/US2011/024637 (Oct. 27, 2011).
Notification of Transmittal of the International Search Report and the Written Opinion of the International Searching Authority, or the Declaration for International Application No. PCT/US2011/024629 (Oct. 27, 2011).
Notification of Transmittal of the International Search Report and the Written Opinion of the International Searching Authority, or the Declaration for International Application No. PCT/US2011/024625 (Oct. 25, 2011).
Notification of Transmittal of the International Search Report and the Written Opinion of the International Searching Authority, or the Declaration for International Application No. PCT/US2011/024611 (Oct. 20, 2011).
Notification of Transmittal of the International Search Report and the Written Opinion of the International Searching Authority, or the Declaration for International Application No. PCT/US2011/024601 (Oct. 20, 2011).
Notification of Transmittal of the International Search Report and the Written Opinion of the International Searching Authority, or the Declaration for International Application No. PCT/US2011/024588 (Oct. 20, 2011).
Non-Final Official Action for U.S. Appl. No. 12/906,816 (Oct. 5, 2011).
Notification of Transmittal of the International Search Report and the Written Opinion of the International Searching Authority, or the Declaration for International Application No. PCT/US2010/053062 (Jun. 28, 2011).
Traffix Systems, "Datasheet; Traffix Signaling Delivery Controller (SDC)," pp. 1-5 (May 2011).
Znaty, "Diameter, GPRS, (LTE+ePC=EPS), IMS, PCC and SDM," EFORT (May 2010). (Part 1 of 2, pp. 1-229).
Znaty, "Diameter, GPRS, (LTE+ePC=EPS), IMS, PCC and SDM," EFORT (May 2010). (Part 2 of 2, pp. 230-460).
"Ericsson Unified Number Portability," (Downloaded from the Internet on Jan. 24, 2011).
"3rd Generation Partnership Project; Technical Specification Group Core Network and Terminals; Policy and Charging Control signalling flows and Quality of Service (QoS) parameter mapping (Release 9)," 3GPP TS 29.213, V9.2.0, pp. 1-129 (Mar. 2010).
"Traffix Diameter Gateway; Instant Diameter Connection to any Network Element," Traffix Systems, pp. 1-4 (Publication Date Unknown) (Downloaded from the Internet on Feb. 8, 2010).
"Traffix Diameter Load Balancer; Scaling the Diameter Control Plane," Traffix Systems, pp. 1-4 (Publication Date Unknown) (Downloaded from the Internet on Feb. 8, 2010).
"Next Generation Networks Load Balancing—The Key to NGN Control, Management, and Growth," Whitepaper by Traffix Systems, pp. 1-7 (Publication Date Unknown) (Downloaded from the Internet on Feb. 8, 2010).
"Universal Mobile Telecommunications Systems (UMTS); LTE; InterWorking Function (IWF) Between MAP Based and Diameter Based Interfaces (3GPP TS 29.305 Version 9.0.0 Release 9)," ETSI TS 129 305 V9.0.0 (Jan. 2010).
"Digital Cellular Telecommunications System (Phase 2+); Universal Mobile Telecommunications System (UMTS); LTE; IP Multimedia (IM) Subsystem Cx and Dx Interfaces; Signalling Flows and Message Contents (3GPP TS 29.228 Version 8.7.0 Release 8)," ETSI TS 129 228 v.8.7.0 (Jan. 2010).
"Mapping Diameter Interfaces to Functionality in 3GPP/3GPP2 IMS Architecture," Whitepaper by Traffix Systems, pp. 1-10 (Copyright 2010).
Jones et al., "Diameter Extended NAPTR," Individual Submission Internet-Draft, draft-ietf-dime-extended-naptr-00, pp. 1-9 (Dec. 29, 2009).
Korhonen et al., "Clarifications on the Routing of Diameter Requests Based on the Username and the Realm," RFC 5729, pp. 1-9 (Dec. 2009).
3GPP, "3rd Generation Partnership Project; Technical Specification Group Services and System Aspects; Generic Authentication Architecture (GAA); Generic Bootstrapping Architecture (Release 9)," 3GPP TS 33.220 V9.2.0 (Dec. 2009).
3GPP, "3rd Generation Partnership Project; Technical Specification Group Service and System Aspects; Telecommunication Management; Charging Management; Diameter Charging Applications (Release 9)," 3GPP TS 32.299 V9.2.0 (Dec. 2009).
3GPP, "3rd Generation Partnership Project; Technical Specification Group Service and System Aspects; Telecommunication Management; Charging Management; Online Charging System (OCS): Applications and Interfaces (Release 9)," 3GPP TS 32.296 V9.1.0 (Dec. 2009).
3GPP, "3rd Generation Partnership Project; Technical Specification Group Core Network and Terminals; Diameter-based Protocols Usage and Recommendations in 3GPP (Release 9)," 3GPP TR 29.909 V9.0.0 (Dec. 2009).
3GPP, "3rd Generation Partnership Project; Technical Specification Group Core Network and Terminals; Sh Interface Based on the Diameter Protocol; Protocol Details (Release 9)," 3GPP TS 29.329 V.9.0.0 (Dec. 2009).
3GPP, "3rd Generation Partnership Project; Technical Specification Group Core Network and Terminals; IP Multimedia (IM) Subsystem

(56) References Cited

OTHER PUBLICATIONS

Sh Interface; Signalling Flows and Message Contents (Release 9)," 3GPP TS 29.328 V9.0.0 (Dec. 2009).
3GPP, "3rd Generation Partnership Project; Technical Specification Group Core Network and Terminals; 3GPP System to Wireless Local Area Network (WLAN) Interworking; Stage 3 (Release 9)," 3GPP TS 29.234 V9.0.0 (Dec. 2009).
3GPP, "3rd Generation Partnership Project; Technical Specification Group Core Network and Terminals; Cx and Dx Interfaces Based on the Diameter Protocol; Protocol Details (Release 9)," 3GPP TS 29.229 V9.0.0 (Dec. 2009).
3GPP, "3rd Generation Partnership Project; Technical Specification Group Core Network and Terminals; IP Multimedia (IM) Subsystem Cx and Dx Interfaces; Signalling Flows and Message Contents (Release 9)," 3GPP TS 29.228 V9.0.0 (Dec. 2009).
3GPP, "3rd Generation Partnership Project; Technical Specification Group Core Network and Terminals; Policy and Charging Control Over Rx Reference Point (Release 9)," 3GPP TS 29.214 V9.2.0 (Dec. 2009).
3GPP, "3rd Generation Partnership Project; Technical Specification Group Core Network and Terminals; Policy and Charging Control over Gx Reference Point (Release 9)," 3GPP TS 29.212 V9.1.0 (Dec. 2009).
3GPP, "3rd Generation Partnership Project; Technical Specification Group Services and System Aspects; Policy and Charging Control Architecture (Release 9)," 3GPP TS 23.203 V9.3.0 (Dec. 2009).
Jiao et al., "The Diameter Capabilities Update Application," Network Working Group Internet-Draft draft-ietf-dime-capabilities-update-01, pp. 1-8 (Dec. 1, 2009).
Tsou et al., "Realm-Based Redirection in Diameter," Internet Engineering Task Force, draft-ietf-dime-realm-based-redirect-02, pp. 1-7 (Oct. 27, 2009).
Huang et al., "The Diameter Precongestion Notification (PCN) Data Collection Applications," Network Working Group Internet-Draft <draft-huang-dime-pcn-collection-02>, pp. 1-19 (Oct. 26, 2009).
Carlberg et al., "Diameter Priority Attribute Value Pairs," Diameter Maintenance and Extensions (DIME) Internet-Draft <draft-carlberg-dime-priority-avps-00.txt>, pp. 1-6 (Oct. 19, 2009).
Korhonen et al., "Diameter User-Name and Realm Based Request Routing Clarifications," Diameter Maintenance and Extensions (DIME) Internet-Draft, draft-ietf-dime-nai-routing-04.txt, pp. 1-13 (Oct. 6, 2009).
Fajardo et al., "Diameter Base Protocol," DIME Internet-Draft, draft-ietf-dime-rfc3588bis-19.txt, pp. 1-160 (Sep. 2, 2009).
3GPP, "3rd Generation Partnership Project; Technical Specification Group core Network and Terminals; Generic Authentication Architecture (GAA); Zh and Zn Interfaces Based on Diameter Protocol; Stage 3 (Release 8)," 3GPP TS 29.109 V8.3.0 (Sep. 2009).
3GPP, "3rd Generation Partnership Project; Technical Specification Group Core Network and Terminals; Numbering, Addressing and Identification (Release 8)," 3GPP TS 23.003 V8.6.0 (Sep. 2009).
Jones et al., "Diameter Extended NAPTR," Internet-Draft, draft-jones-dime-extended-naptr-00, pp. 1-8 (Aug. 23, 2009).
Korhonen et al., "Diameter User-Name and Realm Based Request Routing Clarifications," Internet-Draft, draft-ietf-dime-nai-routing-03-txt, pp. 1-11 (Aug. 19, 2009).
Tsou et al., "Session-Spectific Explicit Diameter Request Routing," Network Working Group Internet-Draft, draft-tsou-diameter-explicit-routing-03, pp. 1-18 (Aug. 5, 2009).
3GPP, "3rd Generation Partnership Project; Technical Specification Group Core Network and Terminals; Evolved Packet System (EPS); Mobility Management Entity (MME) and Serving GPRS Support Node (SGSN) Related Interfaces Based on Diameter Protocol (Release 8)," ETSI TS 129.272 V8.3.0 (Jun. 2009).
Bhardwaj, "Roaming Hubbing & LTE," GSMA London, pp. 1-11 (May 19, 2009).
Jones et al., "Diameter Command Code Registration for the Third Generation Partnership Project (3GPP) Evolved Packet System (EPS)," Network Working Group, RFC 5516, pp. 1-5 (Apr. 2009).
3GPP, "3rd Generation Partnership Project; Technical Specification Group Core Network and Terminals; Diameter-based Protocols Usage and Recommendations in 3GPP (Release 8)," 3GPP TR 29.909 V8.1.2 (Jan. 2009).
Tsou et al., "Diameter Routing Extensions," draft-tsou-dime-base-routing-ext-04, Internet-Draft, pp. 1-28 (Jul. 29, 2008).
3GPP, "3rd Generation Partnership Project; Technical Specification Group Service and System Aspects; Telecommunication Management; Charging Management; Charging Data Description for the IP Multimedia Subsystem (IMS) (Release 5)," 3GPP TS 32.225 V5.11.0 (Mar. 2006).
Liu et al., "Introduction to Diameter," Developer Works http://www.ibm.com/developerworks/library/wi-diameter/index.html (Downloaded from the Internet on Aug. 2, 2011), pp. 1-9 (Jan. 24, 2006).
Aboba et al., "The Network Access Identifier," Network Working Group, RFC 4282, pp. 1-17 (Dec. 2005).
3GPP, "3rd Generation Partnership Project; Technical Specification Group Core Network and Terminals; Policy Control Over Go Interface (Release 6)," 3GPP TS 29.207 V6.5.0 (Sep. 2005).
Eronen et al., "Diameter Extensible Authentication Protocol (EAP) Application," Network Working Group, RFC 4072, pp. 1-31 (Aug. 2005).
Hakala et al., "Diameter Credit-Control Application," Network Working Group RFC 4006, pp. 1-107 (Aug. 2005).
Calhoun et al., "Diameter Mobile IPv4 Application," Network Working Group, RFC 4004, pp. 1-50 (Aug. 2005).
3GPP, "3rd Generation Partnership Project; Technical Specification Group Core Network; Support of Mobile Number Portability (MNP); Technical Realization; Stage 2 (Release 6)," 3GPP TS 23.066, V6.0.0, pp. 1-83 (Dec. 2004).
Calhoun et al., "Diameter Base Protocol," Network Working Group, RFC 3588, pp. 1-148 (Sep. 2003).
Aboba et al., "Authentication, Authorization and Accounting (AAA) Transport Profile," Network Working Group, RFC 3539, pp. 1-39 (Jun. 2003).
Stewart et al., "Stream Control Transmission Protocol," Network Working Group RFC 2960, pp. 1-134 (Oct. 2000).
Greene et al., "Bi-Directional Session Setup Extension to Diameter," Internet Draft <draft-greene-diameter-ss7-session-00.txt>, pbs. 1-12 (Jul. 1998).
Ravikumar et al., "Star-Graph Based Multistage Interconnection Network for ATM Switch Fabric," Parallel and Distributed Processing, pp. 1-8 (Oct. 26, 1994).
"Diameter Overview," referenced from www.ulticom.com/html/products/signalware-diameter-reference-guide.asp, pp. 1-3 (Publication Date Unknown) (Printed from the Internet Aug. 3, 2007).
Non-Final Office Action for U.S. Appl. No. 12/906,816 (Jun. 19, 2014).
First Office Action for Chinese Patent Application No. 201180013381.1 (Jun. 5, 2014).
Applicant-Initiated Interview Summary for U.S. Appl. No. 12/906,816 (May 15, 2014).
Non-Final Office Action for U.S. Appl. No. 13/026,105 (May 12, 2014).
First Office Action for Chinese Application No. 201180008578.6 (May 8, 2014).
Notice of Allowance and Fee(s) Due for U.S. Appl. No. 13/392,608 (Apr. 9, 2014).
First Office Action for Chinese Application No. 201080056996.8 (Apr. 4, 2014).
Office Action for Israel Patent Application No. 219214 (Mar. 3, 2014).

\* cited by examiner

US 8,996,636 B2

METHODS, SYSTEMS, AND COMPUTER READABLE MEDIA FOR ANSWER-BASED ROUTING OF DIAMETER REQUEST MESSAGES

PRIORITY CLAIM

This application is a continuation of U.S. patent application Ser. No. 13/026,112, filed Feb. 11, 2011, which claims the benefit of U.S. Provisional Patent Application Ser. No. 61/304,310, filed Feb. 12, 2010; the disclosures of which are incorporated herein by reference in their entireties.

STATEMENT OF INCORPORATION BY REFERENCE

The disclosures of each of the following commonly-owned, co-pending U.S. Patent Applications filed on Feb. 11, 2011 are hereby incorporated herein by reference in their entireties:

"Methods, Systems, and Computer Readable Media for Inter-Diameter-Message Processor Routing," (Ser. No. 13/025,968, now U.S. Pat. No. 8,478,828);

"Methods, Systems, and Computer Readable Media for Inter-Diameter-Message Processor Routing," (Ser. No. 13/932,608);

"Methods, Systems, and Computer Readable Media for Source Peer Capacity-Based Diameter Load Sharing," (Ser. No. 13/026,031, now U.S. Pat. No. 8,601,073);

"Methods, Systems, and Computer Readable Media for Inter-Message Processor Status Sharing," (Ser. No. 13/026,105);

"Methods, Systems, and Computer Readable Media for Providing Priority Routing at a Diameter Node," (Ser. No. 13/026,060, now U.S. Pat. No. 8,644,324);

"Methods, Systems, and Computer Readable Media for Providing Peer Routing at a Diameter Node," (Ser. No. 13/026,076, now U.S. Pat. No. 8,578,050);

"Methods, Systems, and Computer Readable Media for Providing Origin Routing at a Diameter Node," (Ser. No. 13/026,081, now U.S. Pat. No. 8,554,928);

"Methods, Systems, and Computer Readable Media for Providing Local Application Routing at a Diameter Node," (Ser. No. 13/026,098, now U.S. Pat. No. 8,483,233);

"Methods, Systems, and Computer Readable Media for Answer-Based Routing of Diameter Request Messages," (Ser. No. 13/026,112, now U.S. Pat. No. 8,527,598);

"Methods, Systems, and Computer Readable Media for Performing Diameter Answer Message-Based Network Management at a Diameter Signaling Router (DSR)," (Ser. No. 13/026,125);

"Methods, Systems, and Computer Readable Media for Multi-Interface Monitoring and Correlation of Diameter Signaling Information," (Ser. No. 13/026,133);

"Methods, Systems, and Computer Readable Media for Diameter Protocol Harmonization," (Ser. No. 13/026,144, now U.S. Pat. No. 8,532,110);

"Methods, Systems, and Computer Readable Media for Diameter Network Management," (Ser. No. 13/026,153, now U.S. Pat. No. 8,498,202); and "Methods, Systems, and Computer Readable Media for Diameter Application Loop Prevention," (Ser. No. 13/026,162, now U.S. Pat. No. 8,504,630).

TECHNICAL FIELD

The subject matter described herein relates to routing of Diameter messages. More specifically, the subject matter relates to methods, systems, and computer readable media for answer-based routing of Diameter request messages.

BACKGROUND

Diameter is an authentication, authorization, and accounting (AAA) protocol for computer networks, and is a successor to RADIUS. The Diameter base protocol is defined in IETF RFC 3588, the disclosure of which is incorporated by reference herein in its entirety. Diameter communications may use a request-answer message exchange. Diameter routing involves routing of request messages in one direction and answer messages in the reverse direction. However, Diameter routing does not use information learned from received Diameter answer messages or from non-receipt of expected Diameter answer messages to route request messages.

Accordingly, there exists a need for methods, systems, and computer readable media for answer-based routing of Diameter request messages.

SUMMARY

Methods, systems, and computer readable media for answer-based routing of Diameter request messages are disclosed. According to one method, a Diameter request message is received from a first Diameter node at a. A copy of at least a portion of the Diameter request message is cached at the DSR and the Diameter request message is routed to a second Diameter node. The DSR determines whether a predetermined condition associated with an answer to the first Diameter request message exists. In response to determining that the predetermined condition exists, the cached portion of the Diameter request message is retrieved, a Diameter request that includes the cached portion of the Diameter request message is generated, and the generated Diameter request message is routed. Determining whether the predetermined condition exists may include determining whether a received Diameter answer message that correlates with the request message sent to the second Diameter node includes non-protocol 3xxx error indicator information. Determining whether a predetermined condition associated with an answer message exists may also include determining whether the answer message or the request message is lost. Determining whether the answer or request message is lost may include initiating a timer when the request message is sent to the second Diameter node. If an answer to the request message is not received before the timer reaches a predetermined value, then the answer or the request (or both) is determined to be lost. Determining whether a predetermined condition associated with an answer to the request message exists may also include receiving an answer message, and determining whether additional service information is required before responding to the request originator.

According to another aspect of the subject matter described herein, a system for answer-based routing of Diameter request messages is provided. The system includes a DSR. The DSR includes a Diameter message processor for receiving a Diameter request message from a first Diameter node. The DSR further includes a caching module that caches a copy of at least a portion of the Diameter answer message. The DSR further includes an answer message-based request routing module that is configured to route the Diameter request message to a second Diameter node, to determine whether an error condition associated with an answer to the first Diameter request message exists, and, response to determining that the error condition exists, the answer message-based routing module retrieves the cached portion of the Diameter request message, generates a Diameter request message that includes the cached portion of the Diameter request message, and routes the generated Diameter request message.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon executable instructions that when executed by the processor of a computer control the processor to perform steps. Exemplary non-transitory computer readable media suitable for implementing the subject matter described herein include chip memory devices or disk memory devices accessible by a processor, programmable logic devices, and application specific integrated circuits. In addition, a computer readable medium that implements the subject matter described herein may be located on a single computing platform or may be distributed across plural computing platforms.

BRIEF DESCRIPTION OF THE DRAWINGS

The subject matter described herein will now be explained with reference to the accompanying drawings of which.

DETAILED DESCRIPTION

Figure 1A:
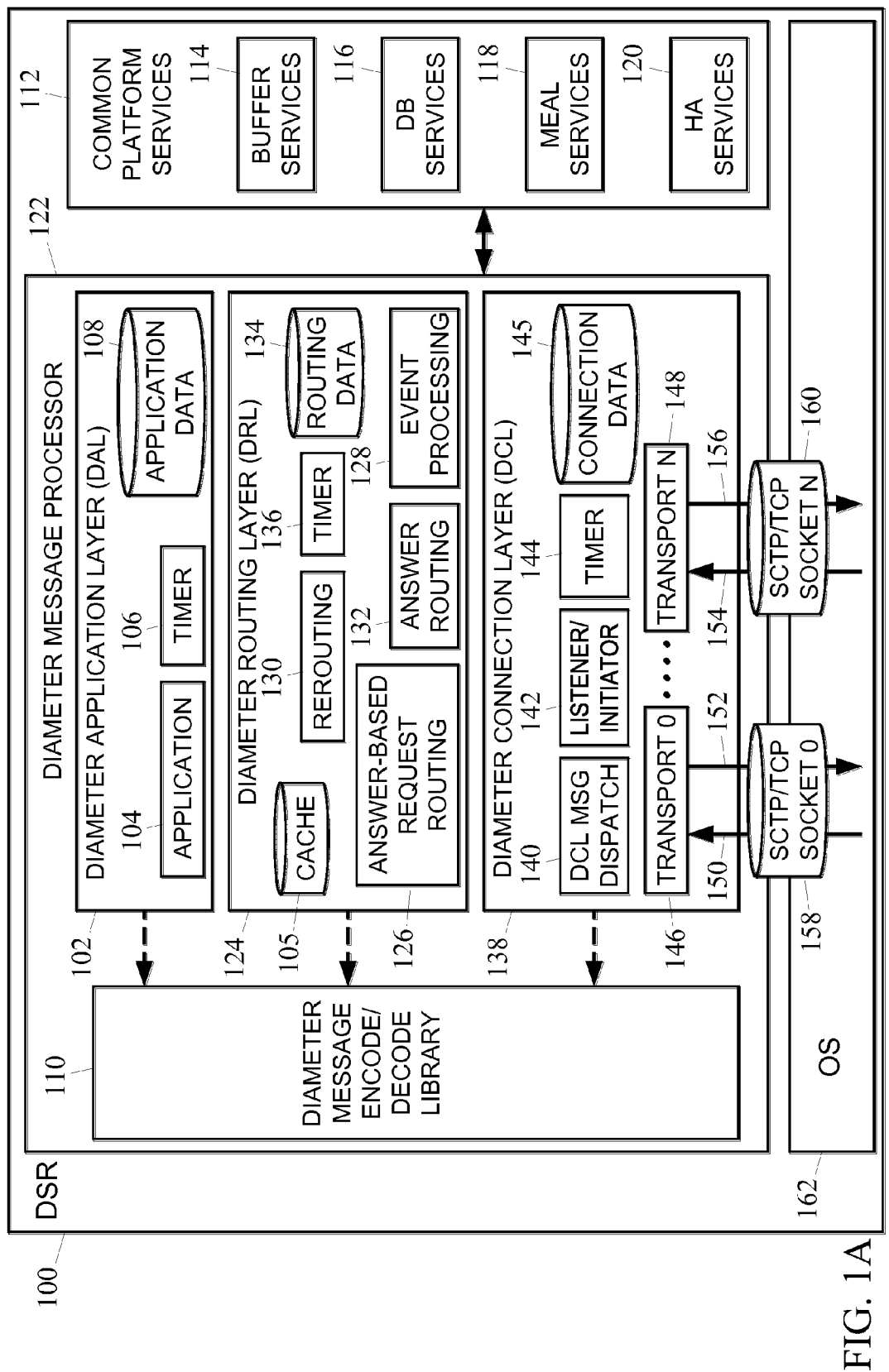
FIG. 1A is a block diagram of an exemplary Diameter signaling router for performing answer-based routing of Diameter request messages according to an embodiment of the subject matter described herein.

FIG. 1A is a block diagram of an exemplary Diameter signaling router (DSR) for performing Diameter answer message-based routing of Diameter request messages according to embodiments of the subject matter described herein. DSR 100 may perform a variety of Diameter message routing functions and, therefore, may include functionality including a Diameter routing agent, Diameter translation agent, Diameter proxy agent, Diameter relay agent, and/or Diameter redirect agent. However, for the sake of simplicity, the term DSR will be used throughout the description of the subject matter disclosed herein to refer to an entity that performs these functions. Referring to FIG. 1A, DSR 100 may include a Diameter connection layer (DCL), Diameter routing layer (DRL), one or more applications, and one or more routing tables. Exemplary DRL capabilities may include: routing request messages to peers or local applications based on message content, discarding or rejecting Diameter request messages based on message content rules, peer congestion control, allowing an operator to access only the features and capacities that are purchased, and easier configuration. DSR 100 may support Relay Agent Diameter message routing and a variety of value-add services/applications. In order to support both application processing and core Diameter routing functions, DSR 100 may support two message routing tables: an application routing table (ART) and a peer routing table (PRT). Additionally, the subject matter described herein for performing Diameter answer-based routing of Diameter request messages may be designed with the assumption that answer messages or routed request messages will be lost and, therefore, effectively handle lost answer or request messages in order to avoid wasting memory or other resources to maintain pending transaction records for transactions that are no longer pending.

Diameter application layer (DAL) 102 may include applications 104. Exemplary applications 104 may include, but are not limited to, a Diameter client, Diameter server, translation agent, proxy agent, redirect agent, integrated monitoring application, Diameter message screening and filtering application, Diameter firewall application, and a load generator. Diameter application layer 102 may also include timer 106 and application data 108. DAL 102 may interface with Diameter message encode/decode library 110 for encoding and decoding Diameter messages.

Common platform services 112 may include buffer services 114, database services 116, measurements events alarms and logs (MEAL) services 118, and high availability (HA) services 120.

Diameter message processor (MP) 122 may further include Diameter routing layer (DRL) 124. DRL 124 may be responsible for the following functions. DRL 124 may perform ingress and egress message looping detection and prevention. DRL 124 may route ingress messages to one or more local DSR applications based upon user-define rules. DRL 124 may reroute messages upon failures. DRL 124 may perform message routing based upon route priorities and weights. DRL 124 may perform message routing based upon user-defined message content. DRL 124 may perform message routing to peers with multiple transport connections. DRL 124 may manage peer transport connections (TPS). DRL 124 may throttle ingress messages based upon local DSR congestion. DRL 124 may detect and avoid peer congestion. DRL 124 may load balance peer connection load to meet transaction per second (TPS) constraints of Diameter message processor 122.

DRL 124 may include answer-based request routing module 126, event processing module 128, DRL rerouting module 130, answer routing module 132, routing data 134, and DRL timer task 136. Answer-based request routing module 126 may perform the operations described herein for answer-based routing of Diameter request messages.

DRL 124 may communicate with DAL 102 via message-based APIs. For example, DRL 124 may use application indication and application request APIs to communicate with DAL 102.

Diameter connection layer (DCL) 138 may perform the following functions. DCL 138 may implement Diameter connection state machine 140 for each Diameter peer. DCL 138 may establish transport connections with Diameter peers and process Diameter peer-to-peer messages and related functionality. This may include capabilities exchange request/answer (CER/CEA), Diameter Watchdog request/answer (DWR/DWA), and Disconnect Peer request/answer (DPR/DPA). DCL 138 may interface with the DRL 124 by sending Diameter messages received from peers to DRL 124 using one or more message-based APIs. DCL 138 may send Diameter messages received from DRL 124 to the appropriate peer. DCL 138 may notify DRL of peer transport connection and congestion status changes. DCL 138 may process configuration and maintenance requests from DSR OAM for transport configuration objects. DCL 138 may update MEAL data for transport configuration objects. DCL 138 may perform transport layer capacity control.

DCL 138 may include Diameter message dispatch module 140, DCL listener/initiator module 142, DCL timer task 144, and connection data 145.

DCL 138 may also include one or more IP transport tasks. For example, DCL 138 may include IP transport task 146 and 148, where each IP transport task includes a receiving thread and a transmitting thread. For example, IP transport task 146 includes Rx thread 150 and Tx thread 152 and IP transport task 148 includes Rx thread 154 and Tx thread 156. IP transport tasks 146 and 148 may each communicate with SCTP/TCP sockets for interfacing with an operating system. For example, IP transport task 146 may communicate with SCTP/TCP socket 158 and IP transport task 148 may communicate with SCTP/TCP socket 160. SCTP/TCP sockets 158 and 160 may be associated with OS 162.

Figure 1B:
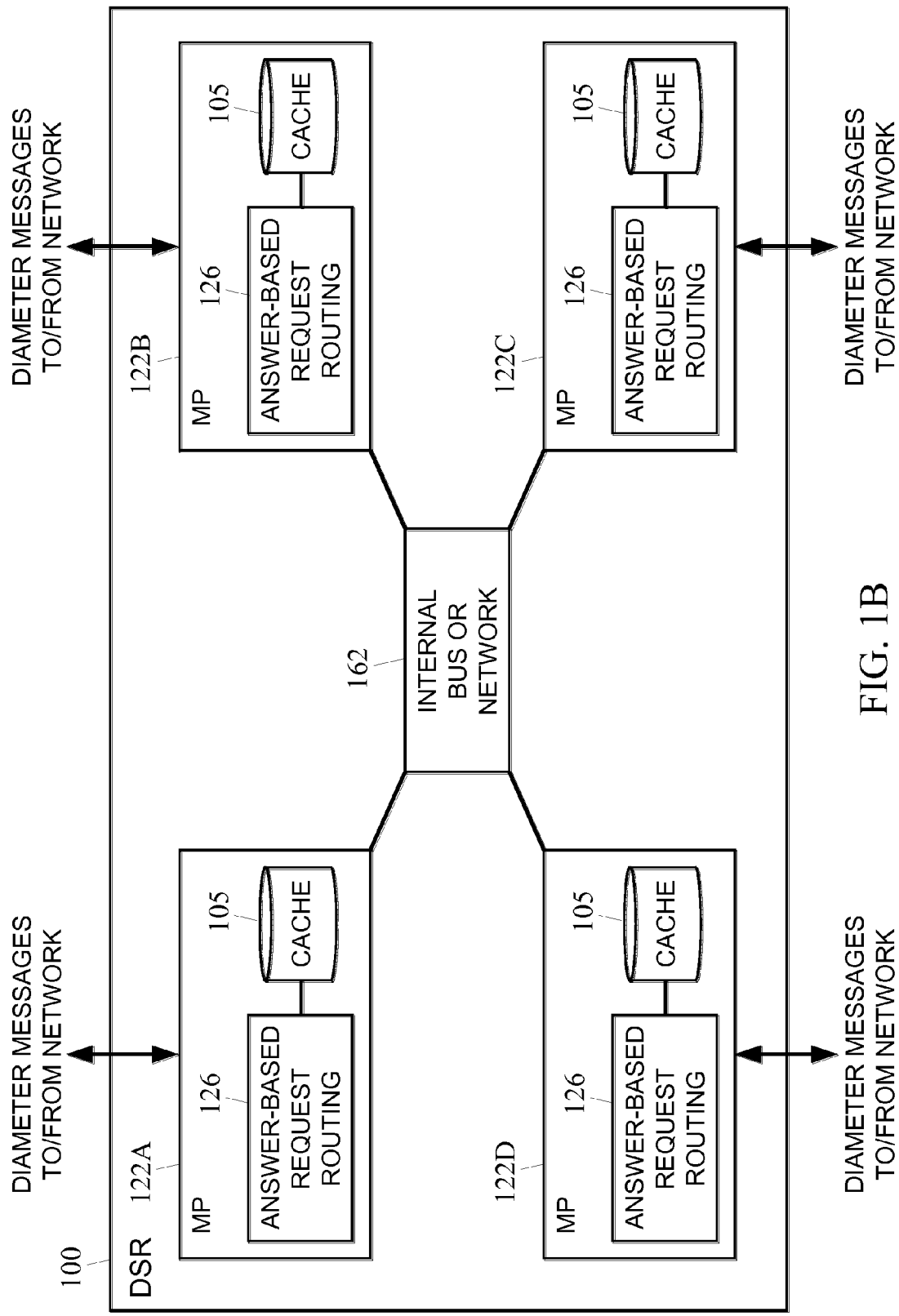
FIG. 1B illustrates an exemplary Diameter signaling router with a distributed internal architecture and that performs answer-based routing of diameter signaling messages according to an embodiment of the subject matter described herein.

For simplicity, DSR 100 illustrated in FIG. 1A includes a single message processor 122. This is one possible configuration of DSR 100, where a single message processor routes all Diameter signaling messages. However, DSR 100 may include plural message processors, each configured as message processor 122 illustrated in FIG. 1A. FIG. 1B illustrates such an embodiment. In FIG. 1B, DSR 100 includes a plurality of message processors 122A-D, each of which sends Diameter signaling messages to and receives Diameter signaling messages from a Diameter network. Message processors 122A-D may be connected through an internal network 162. Although each message processor 122A-D may include all of the components of message processor 122 illustrated in FIG. 1A, for simplicity, only answer-based message routing module 126 and message cache 105 are shown.

In operation, when a Diameter message arrives at one of message processors 122A-D, the message is routed based on Diameter signaling information in the message from the ingress message processor to the egress message processor, and from the egress message processor to the Diameter network. As will be described in detail below, each Diameter message processor 122A-D may perform the steps described herein for answer-based routing of Diameter request messages, which may in some instances over-ride or supplement the routing of Diameter messages based on Diameter signaling information.

Figure 2:
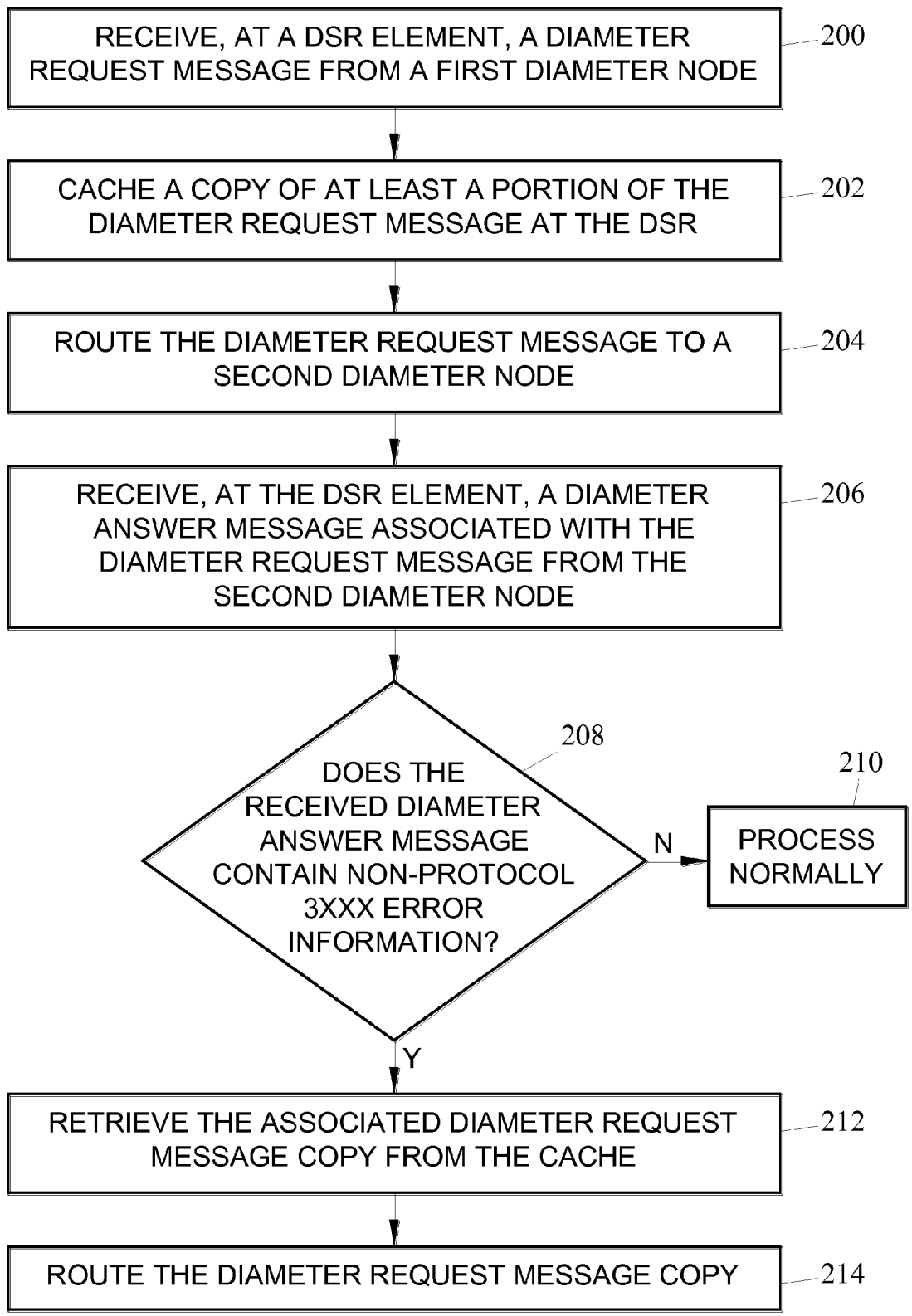
FIG. 2 is a flow chart illustrating exemplary steps for answer-based routing of Diameter request messages according to an embodiment of the subject matter described herein.

FIG. 2 is a flow chart illustrating exemplary steps for answer-based routing of Diameter request according to an embodiment of the subject matter described herein. It may be appreciated that the exemplary scenario described in FIG. 2 includes a determination as to whether Diameter answer messages contain non-protocol 3xxx error information. However, routing of Diameter request messages by DSR 100 is not intended to be limited to only a non-protocol 3xxx error determination and may include determining whether Diameter messages include any error indicator information (e.g., Diameter transient failure 4xxx, Diameter permanent failure 5xxx) without departing from the scope of the subject matter described herein. Referring to FIG. 2, in step 200, a Diameter request message may be received at a DSR from a first Diameter node. For example, a request message associated with service A may be received by DSR 100 from a source Diameter peer node.

In step 202, a copy of at least a portion of the Diameter request message is cached at the DSR. For example, a portion of (or the entirety of) a Diameter request message may be stored in message cache 105 on DSR 100.

In step 204, Diameter request message is routed to a second Diameter node. For example, the request message may be forwarded, by DSR 100, to Diameter node 1 for performing service A.

In step 206, a Diameter answer message associated with the Diameter request message from the second node is received at the DSR. For example, DSR 100 may receive a Diameter answer message corresponding to the Diameter request message for service A.

In addition, one embodiment of DSR 100 may include DCL 138 and DRL 124 being hosted on different computers and/or multiple interacting instances of DCL 138 and DRL 124 (i.e., scalable DSR). As such, an additional step (not shown) may be performed between steps 206 and 208 during which DCL 138 may determine the location of the DRL 124 having the cached copy of the corresponding request message and forward the answer message to that instance of DRL 124. However, for simplicity of illustration and description, unless otherwise noted, embodiments described herein assumed a single instance of DRL 124 co-located with DCL 138.

In step 208, it is determined by answer-based request routing module 126 whether the received Diameter answer message contains non-protocol 3 xxx error information. A non-protocol error is one that occurs at the base protocol level and may require per hop attention. Exemplary 3 xxx error codes and their corresponding descriptions are listed below.

DIAMETER_COMMAND_UNSUPPORTED 3001

The request contained a Command-Code that the receiver did not recognize or support. This is used when a Diameter node receives an experimental command that it does not understand.

DIAMETER_UNABLE_TO_DELIVER 3002

This error is given when Diameter cannot deliver the message to the destination, either because no host within the realm supporting the required application was available to process the request, or because Destination-Host AVP was given without the associated Destination-Realm AVP.

DIAMETER_REALM_NOT_SERVED 3003

The intended realm of the request is not recognized.

DIAMETER_TOO_BUSY 3004

This error must is used when a specific server is requested and it cannot provide the requested service.

DIAMETER_LOOP_DETECTED 3005

An agent detected a loop while trying to get the message to the intended recipient.

DIAMETER_REDIRECT_INDICATION 3006

A redirect agent has determined that the request could not be satisfied locally.

DIAMETER_APPLICATION_UNSUPPORTED 3007

A request was sent for an application that is not supported.

DIAMETER_INVALID_HDR_BITS 3008

A request was received whose bits in the Diameter header were either set to an invalid combination, or to a value that is inconsistent with the command code's definition.

DIAMETER_INVALID_AVP_BITS 3009

A request was received that included an AVP whose flag bits are set to an unrecognized value, or that is inconsistent with the AVP's definition.

DIAMETER_UNKNOWN_PEER 3010

A CER was received from an unknown peer.

Returning to FIG. 2, if the received Diameter answer message does not contain non-protocol 3xxx error information, control proceeds to step 210 where the answer message may be processed normally. For example, if DSR 100 receives an answer message with error cause 'Diameter_Too_Busy' and the Origin-Host of the answer message equals the Destination-Host of the original request, DSR 100 may process the answer message normally. Alternatively, if DSR 100 receives an answer message with error cause 'Diameter_Too_Busy' and the Origin-Host of the answer message does not equal the Destination-Host of the original request, then DSR 100 may discard the answer message and attempt to re-route the request message according to the routeset used to route the original message. Additionally, in the event that a peer node transport failure or timeout is detected, DSR 100 may apply alternate routing of any pending transactions (for which DSR 100 had sent a request, but not received an answer message yet) according to the routeset used to route the original message. If an alternate route is not available when re-routing is attempted, DSR 100 may process the answer message normally.

If the received Diameter answer message contains non-protocol 3 xxx error information, then control proceeds to step 212 where the Diameter request message's copy associated with the Diameter answer message is retrieved from message cache 105 by answer-based request routing module 126.

In step 214, the Diameter message copy is routed by answer-based request routing module 126. The Diameter message may be routed to the second Diameter node and after a configurable number of failed delivery attempts, to a third Diameter node. Alternatively, the Diameter message copy may be sent to a third Diameter node after detecting the error condition associated with the answer message. For example, the request message for service A may be forwarded to Diameter node 2 for performing service A. DSR 100 may allow the user to define a set of cause values which, when received, may result in alternate routing being attempted. The set of cause values may be found, for example, in the result-code attribute value pair (AVP) of the message.

In one embodiment, upon receiving an answer message responsive to a message sent by DSR 100, DSR 100 may add the original Hop-by-Hop ID from the request message to an answer message, forward the answer message to the original peer from which DSR 100 received the corresponding request message, and purge the corresponding request message. It may be appreciated that the user/operator may specify whether to make a copy of an answer message and route it to a specified Diameter destination.

In another embodiment, upon receiving an answer message for which DSR 100 has no pending transaction, DSR 100 may discard the message and, according to one possible embodiment, generate a UIM.

Figure 3:
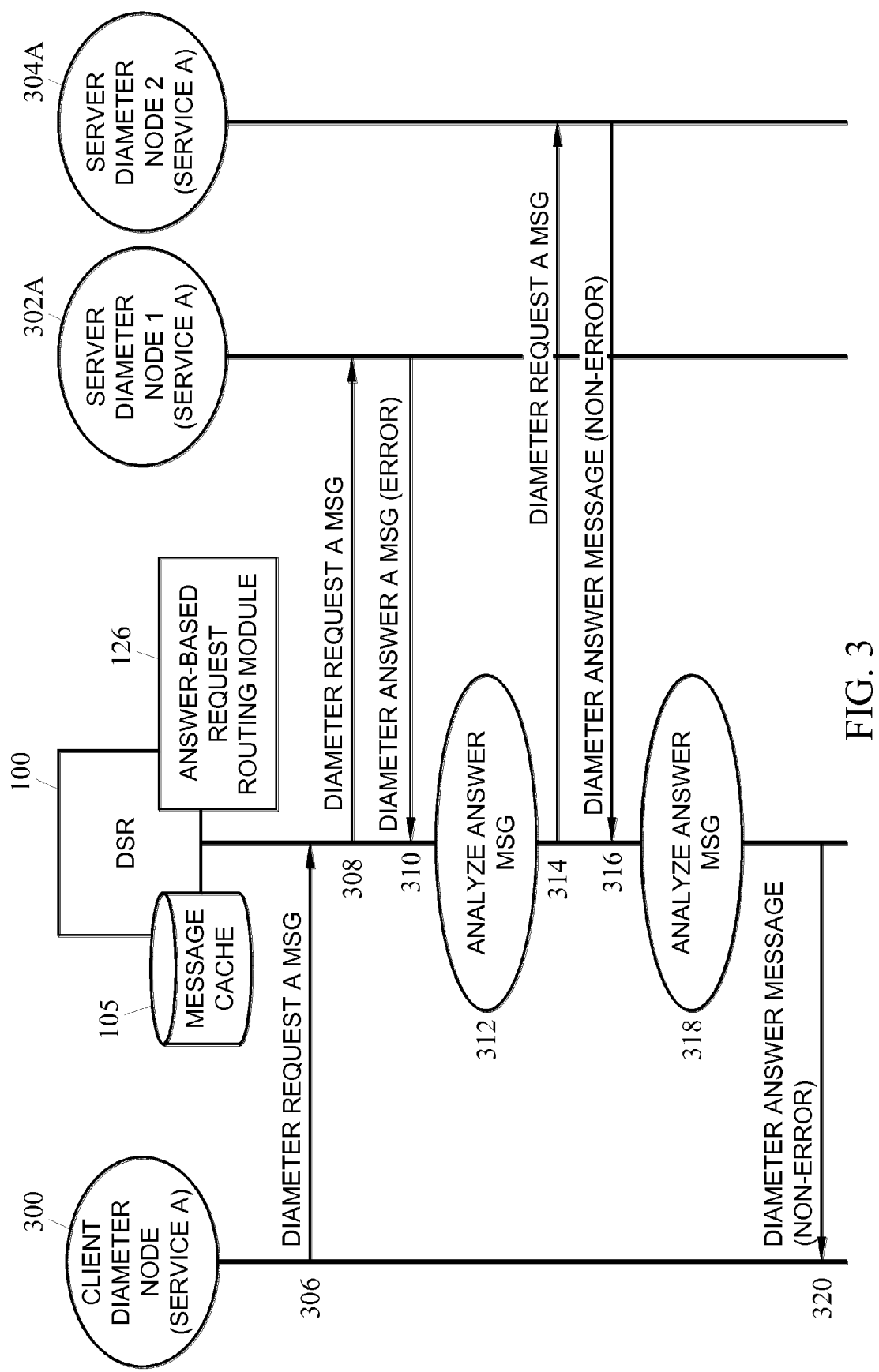
FIG. 3 is a message sequence diagram illustrating an exemplary conditional-on-response "error" condition scenario as part of performing answer-based routing of Diameter request messages according to an embodiment of the subject matter described herein.

FIG. 3 is a message sequence diagram illustrating an exemplary conditional-on-response "error" condition scenario as part of performing answer-based routing of Diameter request messages according to an embodiment of the subject matter described herein. Referring to FIG. 3, DSR 100 and associated answer-based request routing module 126 may communicate with client Diameter node 300, server Diameter node 302A and server Diameter node 304A. For example, client Diameter node 300 may send Diameter request message 306 for service A to DSR 100. DSR 100 may cache a copy of at least a portion of the Diameter request message and route Diameter request message 308 for service A to server Diameter node 302A. Server Diameter node 302A may return Diameter answer message 310 that includes error information. At step 312, DSR 100 may analyze Diameter answer message 310 to determine whether Diameter answer message 310 includes non-protocol 3xxx error information. In the scenario shown, Diameter answer message 310 may be determined to include non-protocol 3xxx error information and, therefore, DSR 100 may retrieve the Diameter request message copy from the cache 105 and route Diameter request message 314 to server Diameter node 304A. In response, server Diameter node 304A may return Diameter answer message 316 (e.g., Answer message (non-error to client Diameter node 300. At step 318, DSR 100 may analyze the answer message and, in step 320, DSR 100 may forward Diameter answer message (non-error) 316 to client Diameter node 300.

Figure 4:
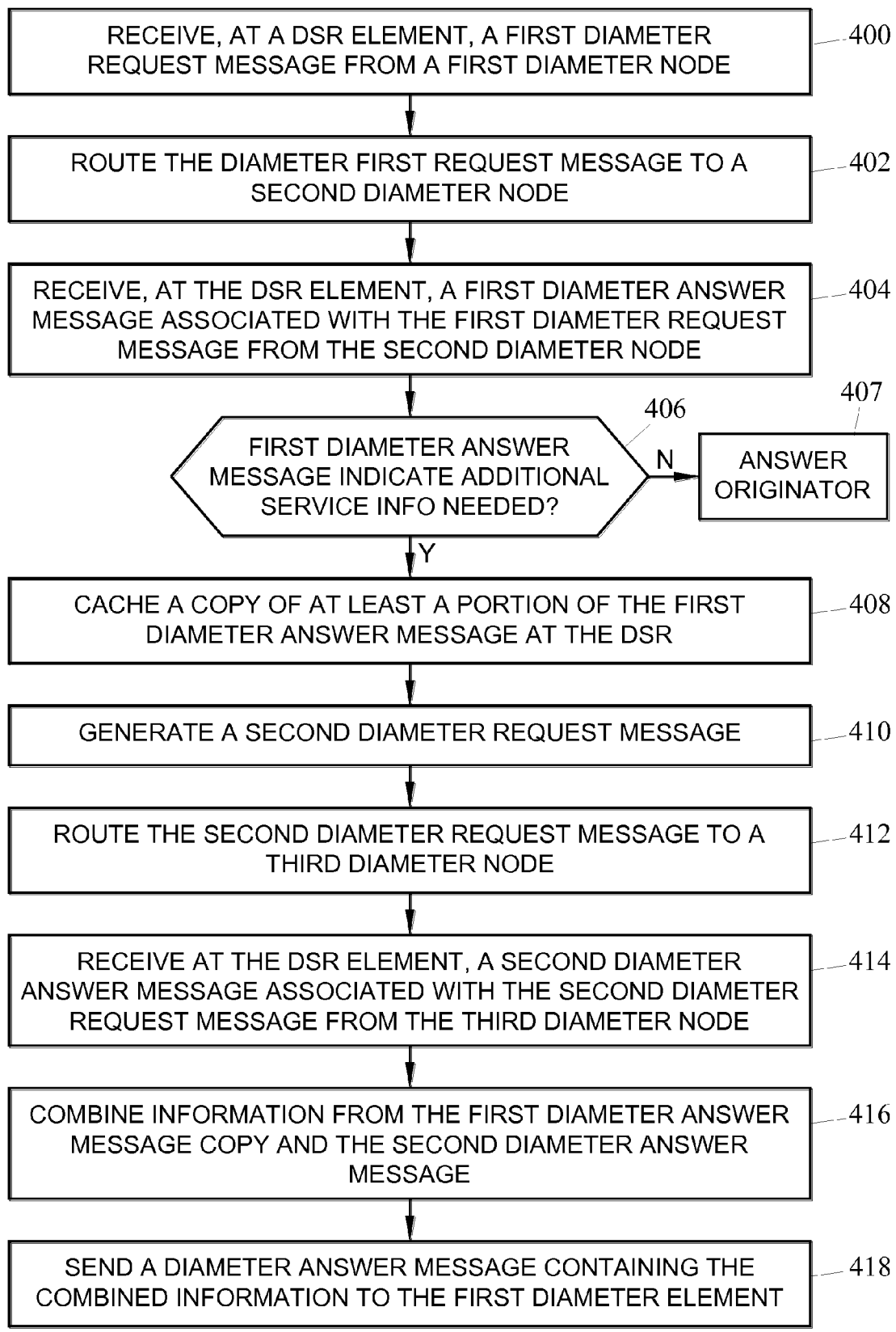
FIG. 4 is a flow chart illustrating exemplary steps for answer-based routing of Diameter request messages according to an embodiment of the subject matter described herein.

FIG. 4 is a flow chart illustrating exemplary steps for performing Diameter answer-based routing of request messages according to an embodiment of the subject matter described herein. In the example illustrated in FIG. 4, information from a first answer message is cached and used to generate and route a new request message, as described above. However, the first answer message may not indicate an error condition, but may indicate that further or additional service information is required before sending an answer to the request originator. Referring to FIG. 4, in step 400, a first Diameter request message is received from a first Diameter node at a DSR. For example, DSR 100 may receive a Diameter request message for service A from a client Diameter node.

In step 402, the first Diameter request message is routed to a second Diameter node. For example, the Diameter request message for service A may be forwarded, by DSR 100, to Diameter node 1, which may be a server.

In step 404, a first Diameter answer message associated with the first Diameter request message from the second Diameter node is received at the DSR. For example, DSR 100 may receive a Diameter answer message from the Diameter server corresponding to the request message for service A.

In step 406, information contained in the first Diameter answer message is analyzed to determine whether additional service information is needed before answering the request originator. For example, the first Diameter request message may be a request for subscriber information from an HSS, and the first answer message may be an indication that the subscriber is not provisioned in the HSS. Accordingly, step 406 may include analyzing the first answer message to determine that a second Diameter request message to a second HSS is needed.

If no additional service information is determined to be needed, control proceeds to step 407 where the DSR sends an answer message to the request originator. If, in step 406, it is determined that additional service information is needed, control proceeds to step 408 where a copy of at least a portion of the first Diameter answer message is cached at the DSR. For example, DSR 100 may cache the answer message in message cache 105. In an embodiment in which the DCL and DRL layers are implemented on different computers, the DCL may determine the location of the DRL having the cached copy of the corresponding request message and may forward the answer message to that instance of the DRL. The DRL may then cache the answer message along with the corresponding request in its message cache 105.

In step 410, a second Diameter request message is generated, and, in step 412, the second Diameter request message is routed to a third Diameter node. For example, Diameter message B may be generated and forwarded to Diameter node 2, which in this example may be a new HSS.

In step 414, a second Diameter answer message associated with the second Diameter request message is received from the third Diameter node. For example, DSR 100 may receive Diameter answer message B. Continuing with the example, answer message B may be an update location answer message from the new HSS and may include the requested subscriber information.

In step 416, information from the first Diameter answer message copy and the second Diameter answer message are combined. For example, information from the first Diameter answer message that indicates that the subscriber is not provisioned in the first queried HSS and information from the second answer message indicating that the subscriber is provisioned in the second queried HSS along with the requested subscription information may be combined.

In step 418, a Diameter answer message containing the combined information is sent to the first Diameter node. For example, a Diameter answer message containing the non-serving HSS, serving HSS, and subscription information may be forwarded to the source Diameter peer node that sent the original Diameter request message.

Figure 5:
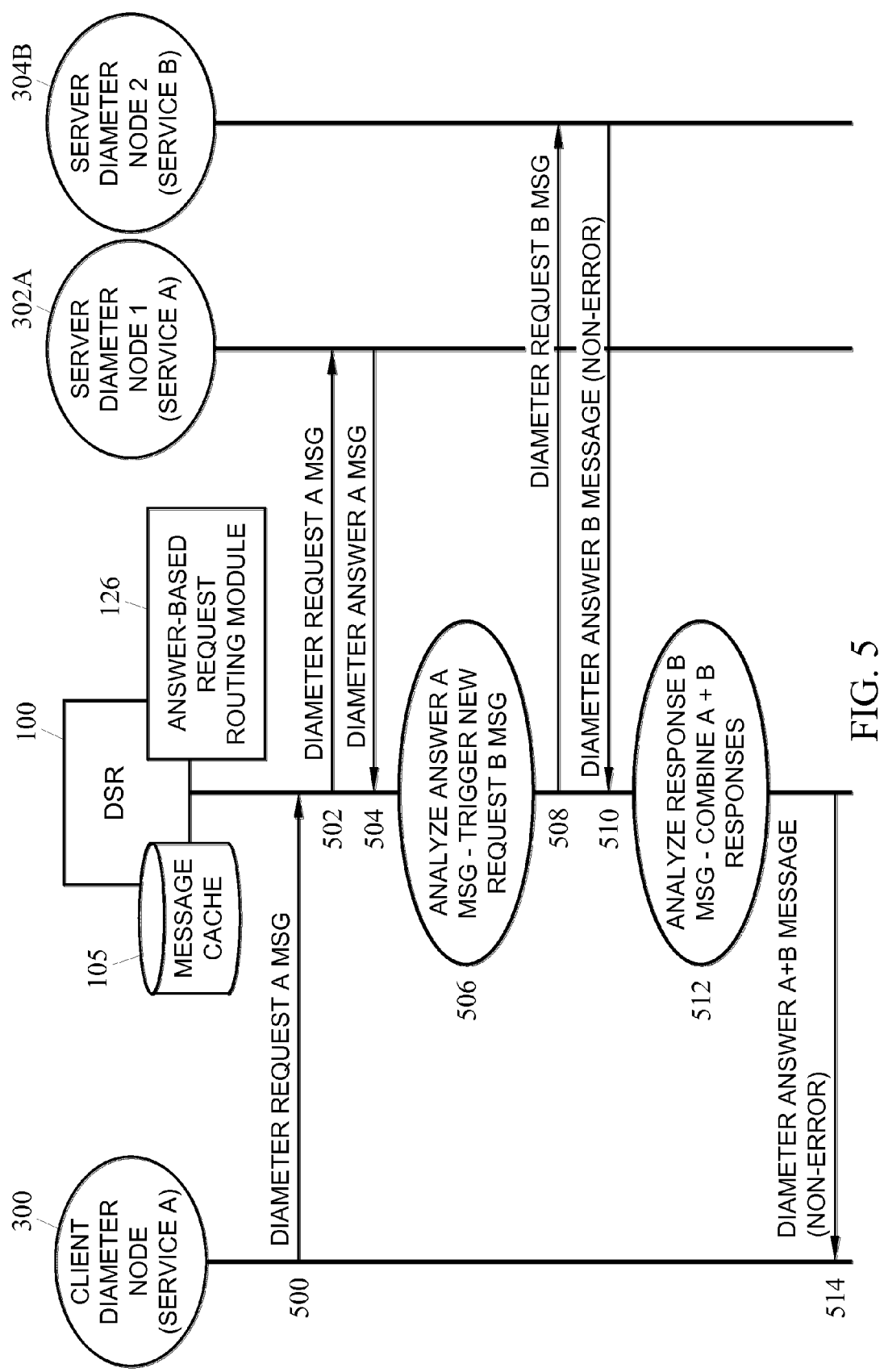
FIG. 5 is a message sequence diagram illustrating an exemplary conditional-on-response "non-error" condition scenario as part of answer-based routing of Diameter request messages according to an embodiment of the subject matter described herein.

FIG. 5 is a message sequence diagram illustrating an exemplary conditional-on-response "non-error" condition scenario as part of performing answer-based routing of Diameter request messages according to an embodiment of the subject matter described herein. The message flow in FIG. 5 provides an example of the processing described above with respect to FIG. 4. Referring to FIG. 5, DSR 100 may include message cache 105 and answer-based Diameter request routing module 126 as described above. In FIG. 5, client Diameter node 300 may send Diameter request message 500 for service A to DSR 100. DSR 100 may cache in message cache 105 a copy of at least a portion of the Diameter request message and forward Diameter request message 502 for service A to server Diameter node 302A. Server Diameter node 302A may return Diameter answer message 504.

At step 506, DSR 100 may analyze the information contained in

Diameter answer message 504 and trigger a new request B message. For example, DSR 100 may determine that additional service is required before answering client Diameter node 300. Examples of additional processing include the above-described HSS example or an example where multiple different service nodes providing the same or different services are required to be queried before responding to a Diameter request originator.

In the scenario shown, DSR 100 may generate Diameter request message 508 for service B, which may be the same or a different service from service A. In response, server Diameter node 304B may return Diameter answer message (e.g., answer message (non-error)) 510 for service B. At step 512, DSR 100 may analyze Diameter answer message 510 and combine information from Diameter answer messages 504 and 510. DSR 100 may then send Diameter answer message 514 containing the combined information from Diameter answer messages 504 and 510 to client Diameter node 300.

Figure 6:
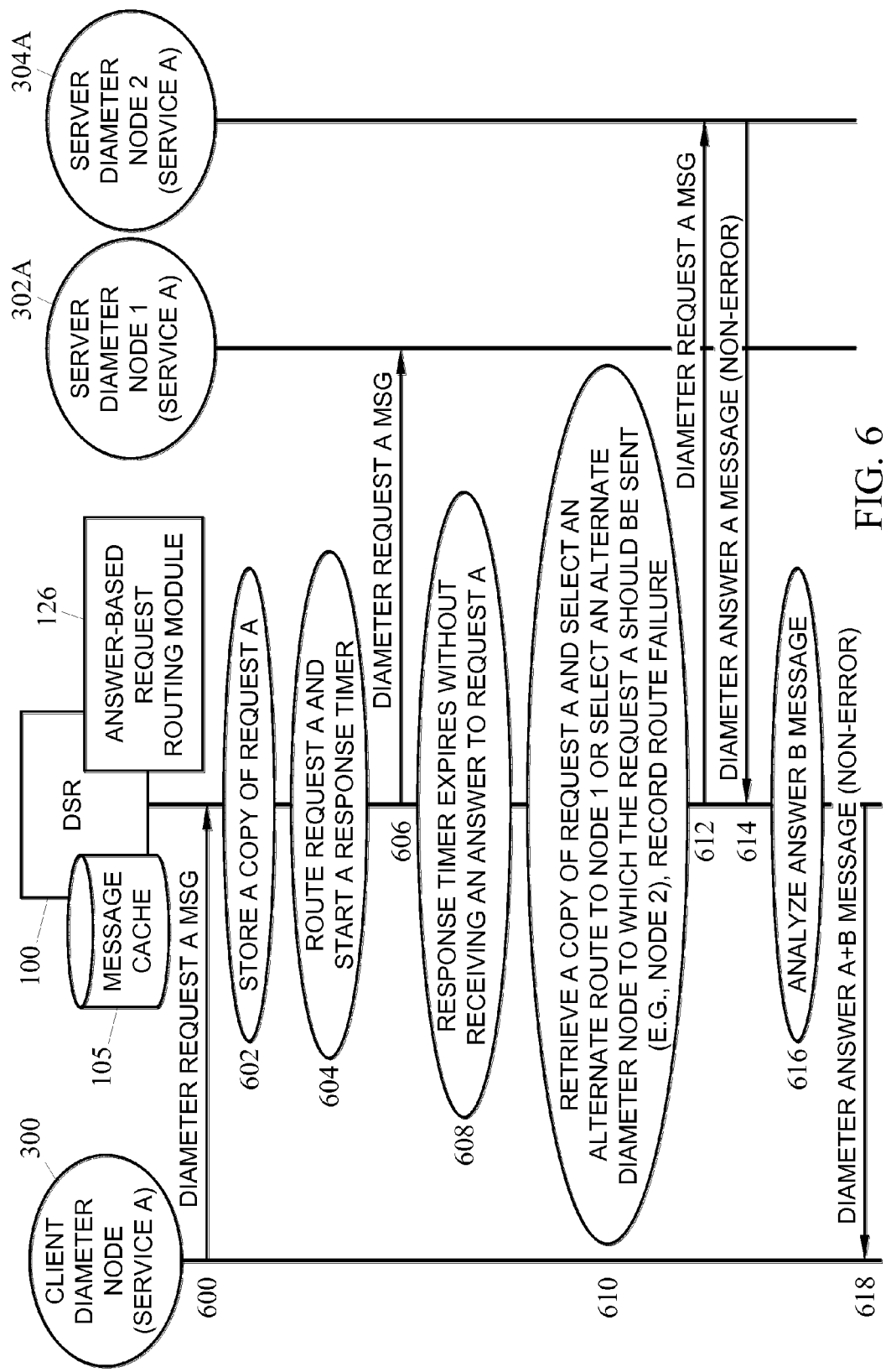
FIG. 6 is a message sequence diagram illustrating an exemplary conditional-on-response "non-error" condition scenario as part of answer-based routing of Diameter request messages according to an embodiment of the subject matter described herein.

FIG. 6 is a message sequence diagram illustrating an exemplary conditional-on-response "non-error" condition scenario as part of performing Diameter answer message-based routing at a DSR according to an embodiment of the subject matter described herein. Referring to FIG. 6, client Diameter node 300 may send Diameter request message 600 for service A to DSR 100.

At step 602, DSR 100 may store a copy of Diameter request message 600. At step 604, request A message may be routed and a response timer may be started. DSR 100 may then send Diameter request message 606 for service A to server Diameter node 302A.

At step 608, it may be determined whether the timer has expired without receiving a Diameter answer message for Diameter request message 606. If the timer has expired, at step 610, DSR 100 may retrieve a copy of Diameter request message 606 and select an alternate route to server Diameter node 302A to which Diameter request message 606 should be sent and record an indication that delivery to server Diameter node 302A was attempted and failed to limit redelivery attempts to server node 302A. DSR 100 may then send Diameter request message 612 to server Diameter node 304A. In response, server Diameter node 304A may return Diameter answer (e.g., answer A message (non-error)) message 614 to DSR 100. At step 616, DSR 100 may analyze answer B message and, at step 618, DSR 100 may forward Diameter answer A+B message (non-error) to client Diameter node 300.

In addition to the scenario described above, it may be appreciated that the loss of a request message sent by DSR 100 may be indistinguishable (e.g., treated the same) from the loss of an answer message sent to DSR 100 by a peer node. In the event of a lost request message, it may be appreciated that the peer node would never send an answer message.

Lost Answer Messages

When answer messages are lost prior to their receipt by DSR 100, the "pending transactions" associated with the lost answer messages may either be aborted (answer message sent to peer) or re-routed. Since DSR 100 cannot "detect" a lost answer message, nor can it query the remote status of a forwarded request message, it may predict with high probability that one has been lost.

One method may be time-based. If an answer has not been received in "X" seconds, then the answer message may be assumed to most likely be lost. The larger the value of "X", the higher the probability of loss. In one embodiment, a DRL "Lost answer Timer" may be supported and operator-configurable. An exemplary default value for X may be 30 seconds. It may be appreciated that the value of X may also be application dependent. For example, if the "Lost answer Timer" is application specific and DSR 100 supports multiple applications, the value may be per-application specific. It may also be appreciated that when the "Lost answer Timer" expires, DRL 124 may abort the transaction (default) and send an answer message to an originator of the request indicating an error condition. In another embodiment, DRL 124 may re-route the transaction. Additionally, it may be appreciated that if a connection fails at DSR 100, and it is the only connection between DSR 100 and a peer node, then all pending answer messages for that connection may be deemed, by DSR 100, to be lost.

Processing Answer Messages From Redirect Agents

As discussed previously, a forwarded request message may be routed to a Redirect Agent which sends an answer message containing an ordered list of hosts for routing the message. The base Diameter specification states that the recipient of a redirect response may re-route a pending request message using Redirect-Host AVPs, but does not require the recipient to do so. Therefore, in one embodiment, rather than re-routing the original request message using the redirect routing information received, DSR 100 may be configured to backwards-route the redirect response. However, because backwards routing may not be supported by a downstream peer in all customer networks, in another possible embodiment, the answer message may be re-routed using Redirect-Host AVPs. It may be appreciated that the process for redirecting an answer message may be a DRL-configurable option. As such, an operator may configure DRL 124 to use backward propagation as the default option.

Routing Answer Messages to Unavailable/Congested Peers

When DRL 124 receives an answer message and the message cannot be immediately delivered because the transport layer queue for the peer is full or the peer is congested, then DRL 124 has two options: delay delivery of the message within DRL 124 or immediately discard the answer message.

Delaying delivery of the message within DRL 124 may include buffering answer messages for a configurable time-period X1. If the peer's status changes before the timer expires, then the buffered answer messages may be forwarded. If the timer expires and the peer is available, then an attempt may be made to forward the buffered answer message until the buffer is flushed or another blocking condition occurs (e.g., transport queue full). In order to prevent an answer message from being queued indefinitely, a "maximum answer message queue delay" may be supported (i.e., message aging) where the answer message may be discarded when the above mentioned maximum delay is exceeded. It may be appreciated that if the transport connection is blocked for an inordinate period of time, preventing any answer messages from being sent, the transport layer may be disconnected in order to clear the condition and trigger the peer to re-forward the messages in the pending transaction queue(s).

It will be appreciated that in some or all of the embodiments described above, the DSR may be adapted to record or log each occurrence of a Diameter answer message error-driven routing event. The DSR may include in such log entries information associated with the related routing action taken by the DSR. The DSR may provide this information Diameter answer-based routing event log information to a network operations center or other network administration system.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for answer-based routing of Diameter request messages, the method comprising:
   at a Diameter signaling router (DSR):
      establishing, using a Diameter connection layer, transport connections with Diameter peers and processing Diameter peer-to-peer messages over the connections;
      receiving a first Diameter request message from a first Diameter node;
      caching, at the DSR, a copy of at least a portion of the first Diameter request message;
      routing the first Diameter request message to a second Diameter node;
      determining whether a predetermined condition associated with an answer to the first Diameter request message exists; and
      in response to determining that the predetermined condition exists:
         retrieving the cached portion of the first Diameter request message;
         generating a second Diameter request message that includes the cached portion of the first Diameter request message; and
         routing the generated second Diameter request.

2. The method of claim 1 wherein routing the generated second Diameter request message includes at least one of: attempting to deliver the generated second Diameter request message to the second Diameter node and sending the generated second Diameter request message to a third Diameter node.

3. The method of claim 1 wherein determining whether the predetermined condition exists includes receiving a Diameter answer message, correlating the answer message with the received first Diameter request message, and determining whether the Diameter answer message includes one of non-protocol 3xxx error indicator information, transient 4xxx error indicator information, and permanent 5xxx error indicator information.

4. The method of claim 1 wherein determining whether the predetermined condition exists includes initiating a timer with the first Diameter request message is routed and detecting that the timer has reached a predetermined value without receipt of an answer message that correlates with the routed first Diameter request message.

5. The method of claim 1 wherein determining whether the predetermined condition exists includes determining whether an operational connection exists between the DSR and the second Diameter node.

6. The method of claim 1 comprising receiving a Diameter answer message and discarding the received Diameter answer message in response to determining that no pending transaction exists at the DSR corresponding to the Diameter answer message.

7. The method of claim 1 comprising storing, at the DSR, Diameter answer message-based routing event log information that includes information associated with at least one occurrence of a detected Diameter answer message-based error condition.

8. The method of claim 7 comprising storing, with the Diameter answer message-based routing event log information at the DSR, routing action information that includes information associated with a routing action taken by the DSR.

9. The method of claim 8 comprising providing, by the DSR, the Diameter answer-based routing event log information to one of a network operations center or network administration system.

10. The method of claim 1 wherein determining predetermined condition exists includes receiving, at the DSR, a first Diameter answer message associated with the first Diameter request message from the second Diameter node, analyzing information contained in the first Diameter answer message, to determine whether additional service information is required before answering the first Diameter node, and, in response to determining that additional service information is required:
   caching at least a portion of the information contained in the first Diameter answer message:
   generating a second Diameter request message; and
   routing the second Diameter request message to a third Diameter node;

receiving, at the DSR, a second Diameter answer message associated with the second Diameter request message from the third Diameter node;

combining the cached information from the first Diameter answer message copy with information from the second Diameter answer message; and sending a Diameter answer message containing the combined information to the first Diameter node.

11. A system for answer-based routing of Diameter request messages, the system comprising:

a Diameter signaling router (DSR) including:

a Diameter connection layer for establishing transport connections with Diameter peers and processing Diameter peer-to-peer messages over the connections;

a Diameter message processor for receiving a first Diameter request message from a first Diameter node;

a message cache for caching a copy of at least a portion of the first Diameter request message;

an answer message-based request routing module for:

routing the first Diameter request message to a second Diameter node;

determining whether a predetermined condition associated with an answer to the first Diameter request message exists; and in response to determining that the predetermined condition exists:

retrieving the cached portion of the first Diameter request message;

generating a second Diameter request message that includes the cached portion of the first Diameter request message; and routing the generated second Diameter request message.

12. The system of claim 11 wherein the answer-based request routing module is configured to attempt to route the generated second Diameter request message to one of: the second Diameter node and a third Diameter node.

13. The system of claim 11 wherein the answer-based request routing module is configured to receive a Diameter answer message, correlate the answer message with the received Diameter request message, and determine whether the received Diameter answer message includes one of non-protocol 3xxx error indicator information, transient 4xxx error indicator information, and permanent 5xxx error indicator information.

14. The system of claim 11 wherein the answer-based request routing module is configured to determine whether the predetermined condition exists by initiating a timer when the Diameter request message is routed and detecting that the timer has reached a predetermined value without receipt of an answer message that correlates with the routed Diameter request message.

15. The system of claim 11 wherein the answer-based request routing module is configured to determine whether an operational connection exists between the DSR and the second Diameter node.

16. The system of claim 11 wherein the Diameter message processor is configured to determine whether no Diameter answer message responsive to the Diameter request message has been received by the DSR.

17. The system of claim 11 wherein the answer—based request routing module is configured to receive a Diameter answer message and discard the received Diameter answer message in response to determining that no pending transaction exists at the DSR corresponding to the Diameter answer message.

18. The system of claim 11 wherein the message cache is configured to store Diameter answer message-based routing event log information that includes information associated with at least one occurrence of a detected Diameter answer message-based error condition.

19. The system of claim 18 wherein the message cache is configured to store, with the Diameter answer message-based routing event log information at the DSR, routing action information that includes information associated with a routing action taken by the DSR.

20. The system of claim 18 wherein the answer-based request routing module is configured to provide the Diameter answer-based routing event log information to one of a network operations center or network administration system.

21. The system of claim 11 wherein, in determining whether the predetermined condition exists, the answer-based request routing module is configured to:

analyze information contained in the first Diameter answer message to determine whether additional service information is required before answering the first Diameter node;

in response to Determining that additional service information is required:

caching at least a portion of the information contained in the first Diameter answer message;

generate a second Diameter request message;

route the second Diameter request message to a third Diameter node; and receiving a second Diameter answer message;

combining the cached information from the first Diameter answer message with information from the second Diameter answer message; and generating and routing to the first Diameter node, a third Diameter message including the combined information.

22. A non-transitory computer readable medium comprising computer executable instructions embodied in a non-transitory computer readable medium and when executed by a processor of a computer performs steps comprising:

at a Diameter signaling router (DSR):

establishing, using a Diameter connection layer, transport connections with Diameter peers and processing Diameter peer-to-peer messages over the connections;

receiving a first Diameter request message from a first Diameter node;

caching, at the DSR, a copy of at least a portion of the first Diameter request message;

routing the first Diameter request message to a second Diameter node;

determining whether a predetermined condition associated with an answer to the first Diameter request message exists; and in response to determining that the predetermined condition exists:

retrieving the cached portion of the first Diameter request message; and generating a second Diameter request message that includes the cached portion of the first Diameter request message; and routing the generated second Diameter request message.

* * * * *